Inventor
K. Okabe

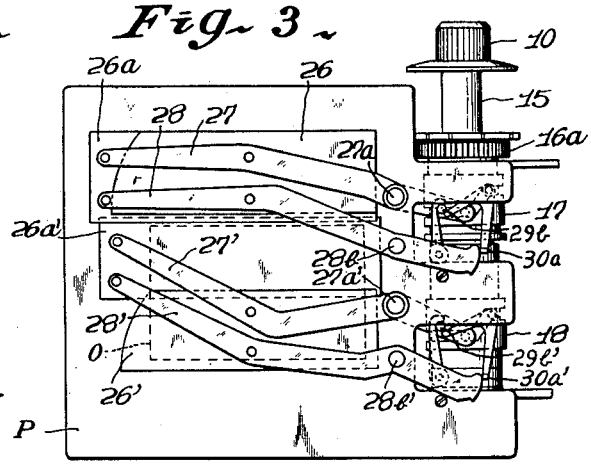
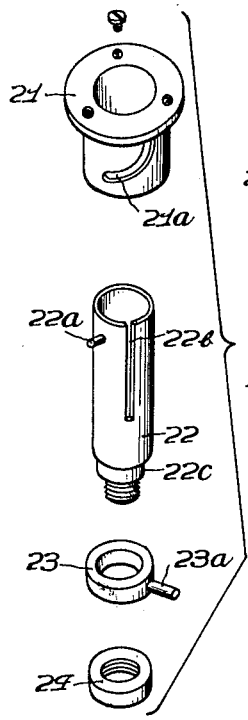
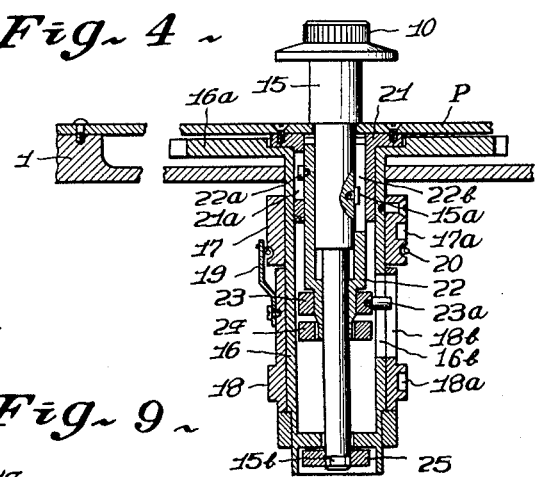
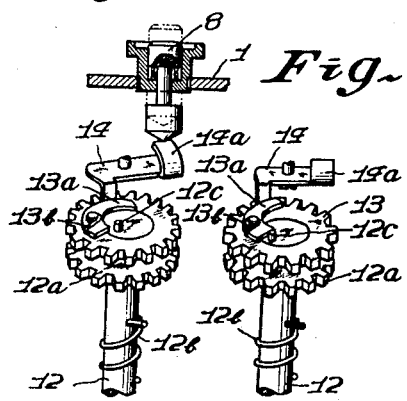

Feb. 26, 1963  KATSUHIKO OKABE  3,078,776
FOCAL PLANE SHUTTER FOR CAMERAS
Filed March 31, 1960  4 Sheets-Sheet 3

Inventor
K. Okabe
By Stewart Dowing Keehl
Attys.

United States Patent Office 3,078,776
Patented Feb. 26, 1963

3,078,776
FOCAL PLANE SHUTTER FOR CAMERAS
Katsuhiko Okabe, Tokyo-to, Japan, assignor to Kabushiki Kaisha Koparu Koki Seisakusho, Tokyo-to, Japan
Filed Mar. 31, 1960, Ser. No. 19,053
Claims priority, application Japan Apr. 6, 1959
2 Claims. (Cl. 95—55)

This invention relates to a focal plane shutter for cameras and more particularly to a focal plane shutter of the type in which an exposure aperture which is positioned just before the film face is made to undergo opening and closing action by the shutter curtains moving up and down on said exposure aperture.

In a well-known focal plane shutter, for example, the adjusting operation of each exposure time 1 to 1/1000 second is carried out by a system in which an operatable stopper and governor are provided in the releasing mechanism for the tensioned closing curtains are operated by actuation of the opening curtains, said stopper and governor being connected with the exposure time adjusting means operable to a shutter speed scale. In said system, said stopper is projected into the path of motion of a lug fixed on the opening curtains and the releasing operation of the closing curtains is varied by the variation of contact position of said lug and said stopper. For example, in the adjustment of 1/50 second to 1/1000 second, said lug is positioned in such relative position that said lug contacts beforehand with a stopper for the closing curtains before the opening curtains open the aperture completely. In this case, the shock which occurs in the contacting of a lug and a stopper disturbs the movement of the closing curtains. Accordingly, the exposure time becomes inaccurate. This disturbance of the exposure time is a great defect of the conventional focal plane shutter.

This invention relates to a focal plane shutter without the above mentioned defect and to improvements of a photographic camera of this type.

An object of this invention is to provide an actuating mechanism of a focal plane shutter of the type in which the opening and closing curtains are driven by different main driving springs, respectively, in order to open and close an exposure aperture, said two main driving springs being cocked at the same time and released with any time intervals by a single releasing means operatively connected with a shutter button.

Another object of this invention is to provide a focal plane shutter of the type in which the opening and closing curtains move uniformly on the exposure aperture without any disturbing of an adjusted exposure time over the film face, providing always the correct exposure.

The novel features of this invention are set forth with particularity in the appended claims. This invention itself, however, both as to organization and its method of operation, together with additional objects and advantages thereof and its comparison with conventional shutter mechanisms heretofore in use, will best be understood from the following description in connection with the accompanying drawing, in which the same members are designated by the same numerals, and in which—

FIG. 3 is an elevational view of a shutter plate assembly removed from the camera body and including shutter controlling mechanism, the parts showing the still position;

FIG. 4 is an elevational view, in section, of the shutter-speed controlling cylinder only, corresponding to an exposure time adjusting knob taken along the line IV—IV of FIG. 2;

FIG. 5 is an exploded, perspective view of the inner cylinder and parts of the cylinder of FIG. 4;

FIG. 9 is a fragmentary perspective view showing the details of the shutter releasing mechanism shown in FIG. 2 after the setting of the shutter;

FIG. 10 is a similar view of the mechanism shown in FIG. 9 just after the pushing of the shutter button;

An embodiment illustrated in the accompanying drawings is substantially the same type as the focal plane shutter of U.S. Patent No. 2,975,689, except the characteristic devices of this invention. The difference of this invention from the said patent consists in that two shutter curtain systems are, respectively, operated by different driving springs in order to move uniformly said two systems through the exposure aperture without affording any disturbance to an adjusted exposure time over the film face, and in that two triangle windows are provided on the exposure time control cylinders for preventing the exposure of the film in the shutter cocking.

Other advantageous devices will be understood from the following description.

Figure 1:
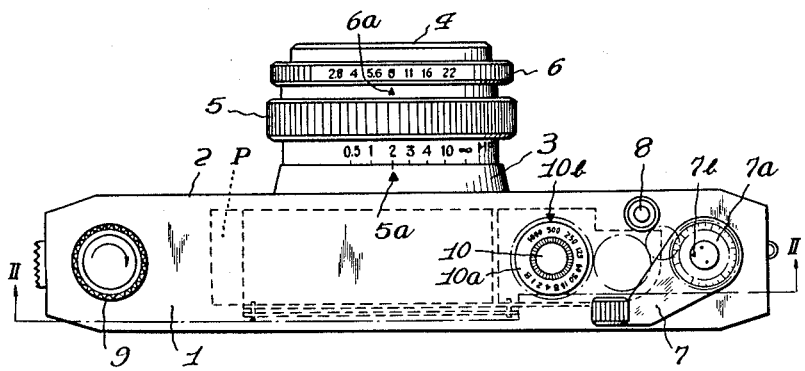
FIG. 1 is a top plan view of a photographic camera including a focal plane shutter constructed in accordance with the present invention.

An actual embodiment of this invention will be described in connection with FIGS. 1 through 11b, in which FIG. 1 illustrates a typical camera which may be controlled by the improved mechanism of this invention. The camera body 1 includes a front wall 2 which may support a lens mount 3 having an objective lens cylinder 4 containing an objective lens, not shown, and comprising a focus adjusting ring 5 and a diaphragm adjusting ring 6. Pointers 5a and 6a are, respectively, marked on the lens mount 3 and the said objective lens cylinder. The camera body 1 further supports a cocking lever 7 comprising a film counter 7a and its pointer 7b, a shutter button 8, a shutter speed adjusting knob 10 with a shutter speed scale 10a, a pointer 10b showing the exposure time adjusting position, and a film rewinding knob 9. A winding gear 11a is fixed at the end of a cylinder 11 which is rotatably fitted around a winding shaft 7c, said gear 11a being wound in only one direction through the winding operation of a cocking lever 7, and a gear 11b rotatably supported by the body 1 is meshed with the gears 11a and a release gear 13. This gear 13 is rotatably fitted around a shaft 12 provided with a setting gear 12a and a return spring 12b. As shown clearly in FIG. 10, said release gear 13 has a stop lever 13a which is forced in the counterclockwise direction by a spring 13b and which releases the setting gear 12a from the release gear 13 through a release lever 14 when the shutter button 8 is pushed, said release lever 14 being rotatably supported by the camera body 1 and arranged so that the shutter button 8 is brought in contact with its inclined lug 14a when said button 8 is pushed downwardly.

Figure 11A:
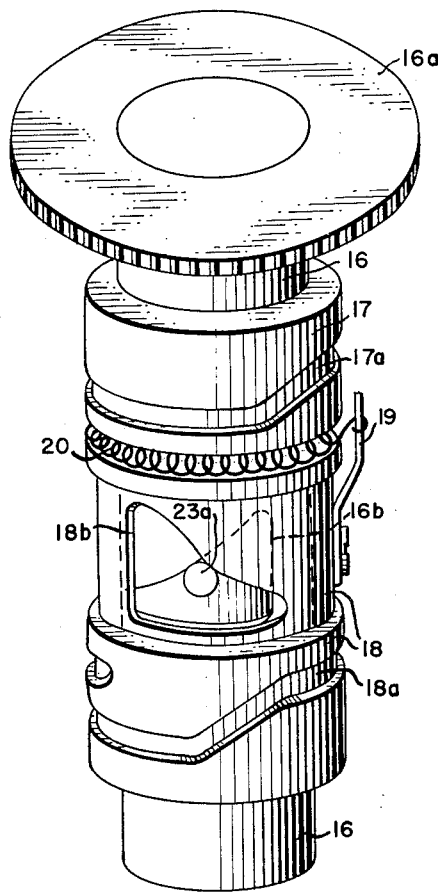
FIGS. 11a and 11b are perspective views of the exposure time control cylinder system, showing the relation of two triangle windows which determine the exposure time and also prevent the exposure of film in the shutter cocking.
Figure 11B:
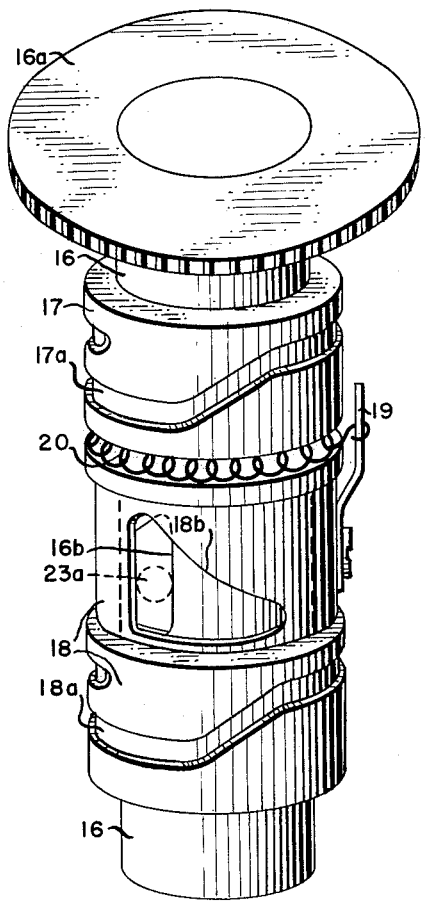

The control cylinder D (FIGS. 2, 4, 5, 11a and 11b) consists of a cylinder 16 rotatably mounted around a fixed cylinder 21, said cylinder 16 being provided with a gear 16a meshed with the aforesaid setting gear 12a, and said cylinder 16 being provided with a reverse L-shaped window 16b as clearly shown in FIGS. 11a and 11b; a cylinder 17 provided with a curved guide or cam groove 17a and secured around the cylinder 16; another cylinder 18 with a similar guide or cam groove 18a and an L-shaped window 18b, said cylinder 18 being rotatably mounted around said cylinder 16 and elastically connected with the cylinder 17 by a coil spring 20 which is made fast to the cylinder 17 and a post 19 fixed on the cylinder 18; a cylinder 22 rotatably mounted in the fixed cylinder 21, said cylinder being provided with a longitudinal guide slot 22b engaged with a pin 15a of a shaft 15 and with a pin 22a extending into the guide slot 21a of the fixed cylinder 21; and a ring 23 having a pin 23a, said ring being rotatably mounted around the step 22c of the cylinder 22.

A speed control shaft 15 rotatably mounted inside of the cylinder 22 has a pin 15a slidably engaged with the longitudinal guide slot 22b. At the threaded end portion 15b, said shaft 15 is held by a nut 25 so as not to move in the longitudinal direction.

A lever 27 rotatably supporting opening curtains 26 and 26a is pivoted on the shutter plate P at a pivotal shaft 27a, and a lever 29 having pins 29a and 29b is pivoted on the reverse side of the shutter plate P at said pivotal shaft 27a, said pin 29a being engaged in the guide groove 17a. On the other hand, an actuating lever 28, having a hook lever 31 provided with a hook portion 31a and having a hook portion 28a, is pivoted on the shutter plate P at a pivotal shaft 28b, said hook lever 31 being rotatably pivoted at a shaft 31b on said lever 28 and forced by a spring 31c to connect with the pin 29b. A crank lever 30 having an arm 30b and a lug 30a is pivoted to the shutter plate P, said arm 30b projecting into the path of the pin 29b and the lug 30a being arranged so as to be hooked with the hook portion 28a when the shutter is cocked, and the spring 31c wound about the pivotal shaft 31b presses on a hook lever 31 so as to connect said lever 31 with the pin 29b. A powerful main spring 32 is wound around the pivotal shaft 28b, the ends of said spring 32 being connected with said pivotal shafts 28b and 31b, respectively, so as to actuate the actuting lever 28.

Figure 2:
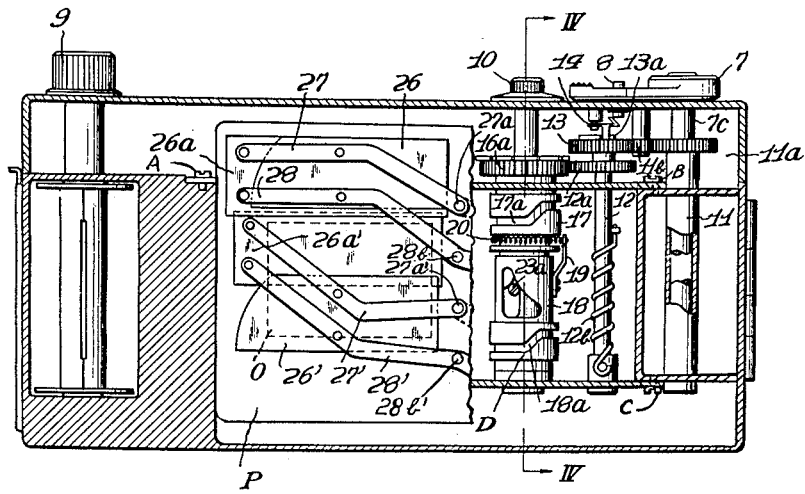
FIG. 2 is a detail section view, in elevation, taken along line II—II of FIG. 1.
Figure 6:
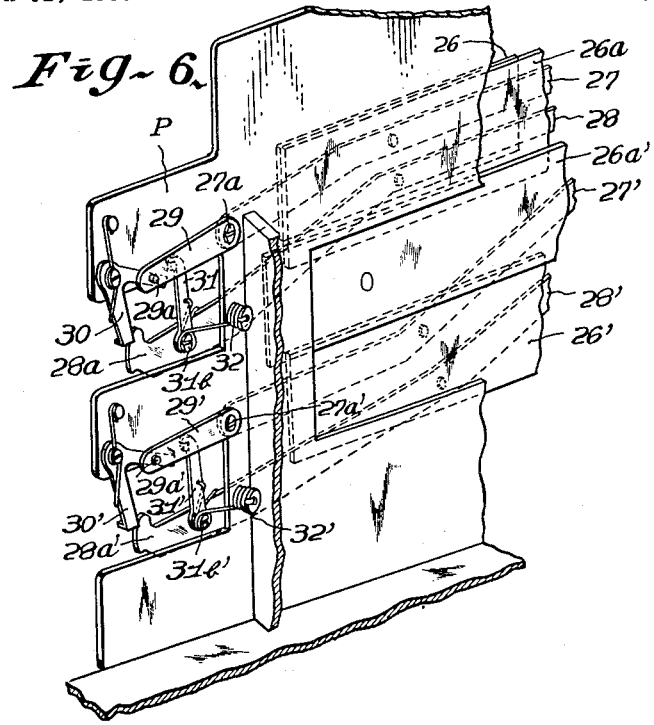
FIG. 6 is a fragmentary perspective view of a latch mechanism for releasing the actuating lever of the opening and closing curtains of the embodiment of FIG. 1.
Figure 7:
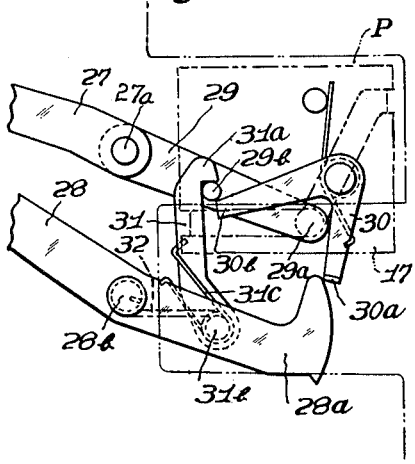
FIGS. 7 and 8 are fragmentary elevational views of the mechanism shown in FIG. 6 before and after setting of the shutter, respectively.

The entire mechanism for actuating the closing curtains is constituted quite similarly to the mechanism of the opening curtains as described above. FIGS. 1 and 2 correspond to the state in which the speed adjusting knob is set at the position of 500 (1/500 second).

When the shaft 7c is rotated by the cocking lever 7, the gear 11a rotates counterclockwise and the gear 12a is rotated counterclockwise through the gears 11a and 11b against the force of the return spring 12b, so that the control cylinder D is rotated clockwise around the shaft 15 by means of the gear 16a as described above. The rotation of the cylinder D causes the cam grooves 17a and 18a to lift the connecting pins 29a and 29a' respectively, so that the pins 29b and 29b' pull up the hook levers 31 and 31'. At the same time, the actuating levers 28 and 28' are rotated counterclockwise around the shafts 28b and 28b' repectively, while cocking the main springs 32 and 32'; and the levers 27 and 27' are also rotated counterclockwise around the pivotal shafts 27a and 27a', respectively. Accordingly, the opening and closing curtains descend into the state of covering the exposure aperture O (FIG. 3).

Figure 8:
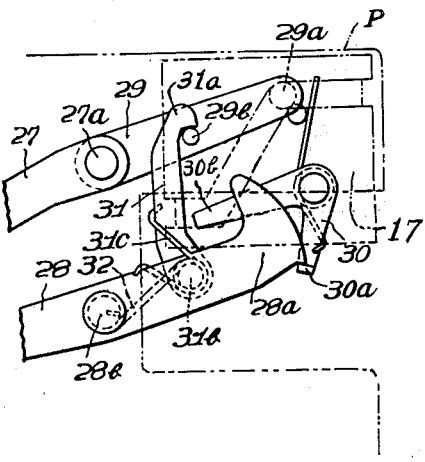

At the last part of the shutter cocking operation such as described above, the hook portions 28a and 28a' are hooked with the lugs 30a and 30a', respectively, as shown in FIG. 8, and only the cocking lever 7 returns to the initial position by means of a conventional device (not shown).

Next, when the button 8 is pushed downwardly by hand, the lever 14 rotates counterclockwise around its shaft, and the lever 13a is released from a pin 12c fixed on the shaft 12 as shown in FIG. 10, so that the gear 12a, and said shaft 12 are made to rotate rapidly clockwise by the force of the spring 12b, and the control cylinder D is rotated counterclockwise by the gear 16a. The rotation of the cylinder D causes the levers 29 and 29' to rotate clockwise around the pivotal shafts 27a and 27a', respectively, through the influence of the guide grooves 17a and 18a as described previously.

At the last part of the movement of the levers 29 and 29', the pins 29b and 29b', respectively rotate the crank levers 30 and 30' in the counterclockwise direction, and the actuating levers 28 and 28' are respectively released by the lugs 30a and 30a', so that the levers 28 and 28' are rapidly rotated clockwise around the shafts 28b and 28b' by the force of the main springs 32 and 32', respectively.

Accordingly, the opening and closing curtains 26, 26a, 26' and 26a' pass over the exposure aperture O with high speed. In this case, the curved position of the guide groove 17a relative to the shaft 15 is stationary, but the curved position of the other guide groove 18a relative to the guide groove 17a is varied by the adjusting operation of the knob 10, so that the starting instant of the lever 29 is constant but the starting instant of the lever 29' is varied by the knob 10. Accordingly, the starting instant of the closing curtains 26' and 26a' with respect to that of the opening curtains 26 and 26a can be adjusted in accordance with the shutter speed.

For example, according to the shutter in FIGS. 1, 2, and 4, when the shutter speed control knob 10 is adjusted to lower the speed, the shaft 15 rotates counterclockwise, and the cylinder 22 also is rotated counterclockwise therewith while being lifted by the guide slot 21a of the fixed cylinder 21, so that the pin 23a of the ring 23 secured with the cylinder 22 by the nut 24 causes the guide cylinder 18 to rotate counterclockwise against the spring 20, through both the reverse L-shaped window 16b and the L-shaped window 18b. Accordingly, the relative position of the guide grooves 17a and 18a is adjusted so that, when the shutter is released, starting instant of the closing curtains 26' and 26a' may be retarded. Conversely, when the shutter speed control knob 10 is adjusted to the faster speed, this shutter speed control cylinder D is operated in the opposite movement.

According to this invention as described above, by provision of the special shutter speed control cylinder D, the starting point of the rigid closing curtains 26' and 26a' with respect to that of the rigid opening curtains 26 and 26a can be adjusted by the shutter speed control knob 10.

In the shutter mechanism of this invention, the shutter plate P is connected with the camera body by screws A, B and C, so that the shutter plate P is detachable from the camera body 1.

Said two windows 16b and 18b which are, respectively, provided on the cylinders 16 and 18 are used not only to control the exposure time, but also to prevent the exposure of the film face in the shutter cocking operation. In the shutter cocking operation, only the cylinder 16 is previously rotated from such an exposure time setting position as shown in FIG. 11a, to such a position where the phase of the curved guide groove 17a coincides with that of the curved guide groove 18a as shown in FIG. 11b while tensioning the spring 20; and next, the cylinder 18 is also rotated with the cylinder 16 through the pin 23a, so that the opening and closing curtains go down to the shutter cocked position through the exposure aperture O without causing any exposure of the film. In the shutter releasing operation, after only the cylinder 16 has been previously rotated with a release of said spring 20 to the position corresponding to the preset exposure time, said two cylinders 16 and 18 rotate together for releasing the opening and closing curtains in succession determined by the angular displacement between them.

While I have shown and described certain specific embodiments of my invention, I am fully aware that many modifications thereof are possible. This invention, there-

What I claim is:

1. In a focal plane shutter of the type having first and second rigid curtain elements moved between cocked and exposed positions across an exposure aperture in a shutter base plate by first and second actuating levers, respectively; a shutter actuating mechanism including first and second main springs severally connected with said actuating levers for driving said respective elements across the exposure aperture without disturbing the adjusted exposure time, first and second latch members holding each said actuating lever against its main spring at the shutter cocked position, first and second hook levers severally pivoted on said actuating levers, a rotatable assemblage of first and second relatively angularly displaceable cam cylinders including cam surfaces operatively engaging said actuating levers, an exposure preventing device to prevent exposure during the cocking of the shutter, a first and a second latch operating means pivoted on the shutter base plate and engaged severally with said first and second cam cylinders in such a manner that when said cylinders are rotated in cocking the shutter, said first and second latch operating means move said hook levers simultaneously on said exposure preventing device until said actuating levers engage said latch members at the shutter cocked position, and when said cylinders are rotated reversely in the shutter releasing these latch operating means release said actuating levers from said latch members in succession as determined by the angular displacement between said cylinders.

2. A focal plane shutter as defined in claim 1, in which said cam cylinders each include an interfitting telescoped cylinder portion and in which the device for preventing the exposure during shutter cocking comprises a reverse L-shaped triangular window provided on the cylinder portion of one said cam cylinder, an L-shaped triangular window provided on the cylinder portion of the other said cam cylinder, and a pin which is passed through said two windows and movable with said cylinders, whereby in cocking the shutter said one cylinder is rotated to the position where said pin is held securely between the vertical edges of said two windows before said cylinders can be rotated together for cocking said shutter elements to prevent exposure of film.

References Cited in the file of this patent
UNITED STATES PATENTS

| | | |
|---|---|---|
| 2,195,330 | Hineline | Mar. 26, 1940 |
| 2,271,235 | Stechbart | Jan. 27, 1942 |
| 2,283,533 | Brueske | May 19, 1942 |
| 2,901,954 | Amano | Sept. 1, 1959 |
| 2,975,689 | Chatani | Mar. 21, 1961 |

UNITED STATES PATENT OFFICE
CERTIFICATE OF CORRECTION

Patent No. 3,078,776                                February 26, 1963

Katsuhiko Okabe

It is hereby certified that error appears in the above numbered patent requiring correction and that the said Letters Patent should read as corrected below.

In the grant, lines 2 and 12, and in the heading to the printed specification, lines 3 and 4, name of assignee, for "Kabushiki Kaisha Koparu Koki Seisakusho", each occurrence, read -- Kabushiki Kaisha Koparu --.

Signed and sealed this 31st day of March 1964.

(SEAL)
Attest:
ERNEST W. SWIDER

Attesting Officer

EDWARD J. BRENNER

Commissioner of Patents